June 26, 1962  H. VON RATH  3,040,401
MOLDING FASTENER
Filed June 12, 1958
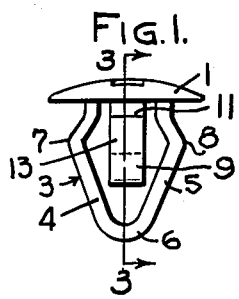
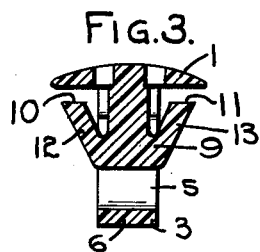
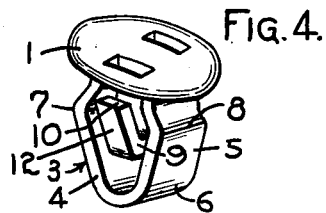
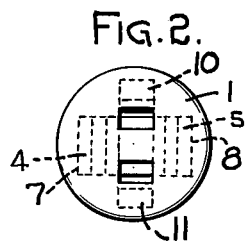
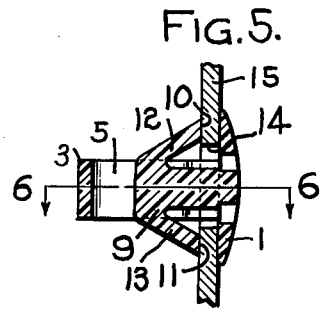
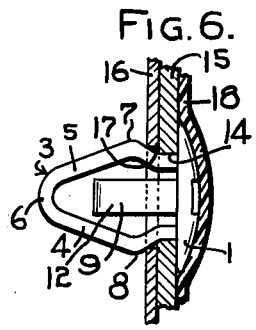
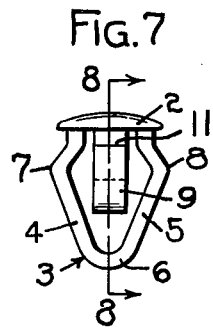
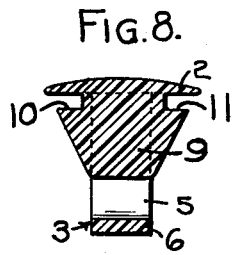
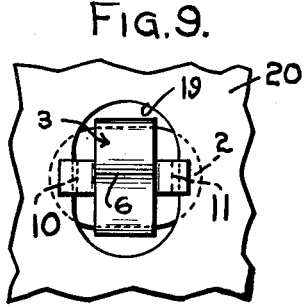
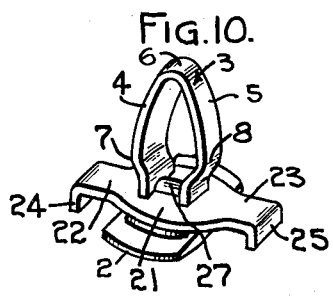
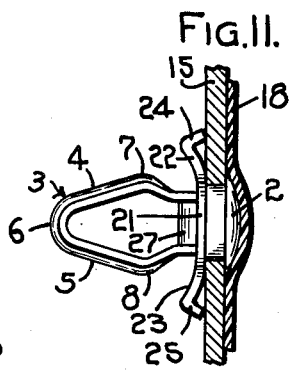
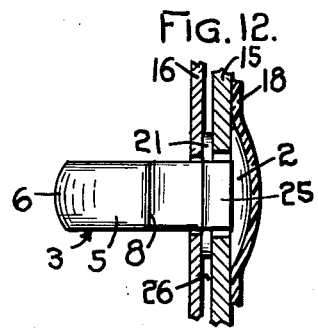
INVENTOR:
HERBERT VON RATH,
BY Philip E. Parker
ATTORNEY.

3,040,401
MOLDING FASTENER
Herbert von Rath, Kandern, Oelmaettle, Germany, assignor to A. Raymond, Lorrach, Baden, Germany, a firm
Filed June 12, 1958, Ser. No. 741,488
Claims priority, application Germany June 15, 1957
1 Claim. (Cl. 24—73)

This invention relates to a clamp for attachment of a plate-shaped trim to a support and particularly to the inside linings of automobile body walls.

It is the present practice to use clamps consisting of a head portion and spring tongues which are held by the head portion at the trim and snap into the support by their spring tongues. Such clamps have heretofore been punched out of thin spring steel and bent into their respective form. This production requires a plurality of operations and tools and in many cases, an after-treatment for rust protection, which adds to the total cost of the relatively simple clamps.

It is the object of the invention to provide a clamp which does not have the above disadvantages. For this purpose it is cast in one piece from a suitable plastic material, e.g., polyamide or the like, in the required form, and it consists of a flat round, or flat oblong head with a closed spring tongue having two spring legs. Between the legs there is provided either a bridgepiece starting from the head or a collar around the spring tongue near the head. The clamp is introduced into a corresponding opening in the trim, so that the head will be located on one side and the bridgepiece or collar on the other side of the trim. Thus the clamp is secured at the trim by the head and bridgepiece or collar. To connect the trim with the support, the clamp is inserted by its spring tongue through a respective opening in the support until the shoulders of the spring legs snap in behind the edge of the bore.

Further details and characteristics of the invention will be evident from the description of several examples represented in the drawing.

In the drawing:

FIGS. 1 to 3 show a clamp design in side view, plan view, and longitudinal section along line 3—3 of FIG. 1;

FIG. 4 is a perspective view of the clamp.

FIG. 5 is a view in longitudinal section showing the clamp inserted in a trim;

FIG. 6 is a view in section taken on line 6—6 of FIG. 5;

FIG. 7 is a view similar to FIG. 6 of a modified design of the fastener;

FIG. 8 is view in section taken on line 8—8 of FIG. 7;

FIG. 9 is an underneath plan view of the fastener inserted into a panel;

FIG. 10 is a view in perspective of a further modification of the clamp;

FIGS. 11 and 12 show the clamp of FIG. 10 at different processes of attachment.

Referring to the drawing, the clamps as shown in FIGS. 1 to 9 are molded or formed in one piece from a suitable plastic material, e.g., polyamide or the like and consists of a flat round or flat oblong head 1 or 2 and a spring tongue 3 with two spring legs 4 and 5 preferably of rectangular section. At their free ends the spring legs are joined by a loop 6. Moreover, they are bent outward in knee or elbow form a little below their connection with the head so that shoulders 7 and 8 are formed. Between the spring legs is a bridgepiece 9 which is joined adjacent the head, tapering in wedge form, and which is provided at the narrow sides near the head with lugs also forming shoulders 10 and 11. These shoulders can start from the bridgepiece rigidly (FIGS. 7 and 8) or they can be formed by the upper face of two spring flaps 12 and 13 and resiliently connected to the bridgepiece (FIGS. 1 to 6).

The clamp according to FIGS. 1 to 4 is pressed into a round bore 14 or a square cut out of the trim, for example, a door trim 15, as shown in FIG. 5. The two spring flaps 12 and 13 spread apart after passage through the bore and retain the clamp at the door trim, which can now be joined with the support, e.g., a body wall 16 (FIG. 6). For this purpose the body wall is provided in the spacing of the clamps with round or square openings 17, into which the spring tongue 3 can be pressed until the shoulder 7 and 8 of the spring legs snaps in. If the trim is to be provided with a cover 18, the latter can now be glued on. For simple designs of an inside lining the clamp can also be pressed into the trim with the head exposed. The color of the plastic material for the clamp is advantageously adapted in this case to the color of the lining, so that the head is barely visible.

The clamp is introduced by its oblong head 2 into a similarly oblong slot 19 from the back of the trim 20 and rotated about 90°. Here the trim may be provided with a cover as shown in FIG. 5 as the flat head 2 inserts itself easily between cover and trim. The openings in the body plate into which the spring legs snap are given a rectangular form corresponding to the spring tongue 3, so that the clamp is thereby secured against rotation and cannot become detached from the trim.

The clamp shown in FIG. 10 likewise has a flat oblong head 2 with spring tongue 3 in the described design and is connected with the trim like the clamp according to FIGS. 7 and 8. However, it is intended to be received in round bores of the body plate and therefore must be specially secured against rotation. For this purpose, at variance, with the design according to FIGS. 1 to 9, and eliminating the bridgepiece 9, the clamp is formed around the spring tongue 3, and near the head 2 a collar 21 with two spring flaps 22 and 23 is formed whose free ends are bent toward the plane of the head to form shoulders 24 and 25. As the clamp is introduced from the back into the slot 19 of the trim by its oblong head 2, the shoulders 24 and 25 are pushed back resiliently, as shown in FIG. 11 and the clamp is rotated until the shoulders snap into the slot 19. The clamp is thereby held in the trim and secured against rotation. The trim can now be joined with the support 16 by snapping in the shoulders 7 and 8 of the spring tongue 3. The clamp then applies by its collar 21 against the body wall, and a small interstice 26 is formed. The collar 21 seals the body wall from the inside against moisture and water.

The clamps may be provided at suitable points with reinforcement ribs 27, as shown in FIG. 10. Also the spring tongue 3 may, in particular in the clamp design according to FIG. 10 be given a closed, such as a sack-like form, resulting in a waterproof seal in the body wall.

The clamps according to FIGS. 7 and 10 have the particular advantage that when damaged, they can easily be exchanged without having to remove the cover 18. Also, since they need be inserted in the wall trims only during assembly of the vehicle or just before and they enable an easy stacking and transportation of the trims.

Since certain other obvious modifications may be made in this device without departing from the scope of the invention, it is intended that all matters contained herein be interpreted in an illustrative and not in a limiting sense.

I claim:

A one-piece molded plastic fastener having a relatively rigid head at one end, a closed loop portion joined to said head and providing opposed yieldable legs shaped to snap into engagement with a support and an attaching means comprising a post portion in substantially attached normal relationship with said head portion and at least two legs each having one end attached to said post portion and the opposite end of each of said legs spaced from said post portion, directed toward the plane of said head, and having a shoulder in substantially spaced parallel relationship with the plane of said head and on the same side of the head as said loop portion for cooperation with the head to hold the fastener to a part to be attached to a support.

References Cited in the file of this patent

UNITED STATES PATENTS

| | | |
|---|---|---|
| 2,300,478 | Wiley | Nov. 3, 1942 |
| 2,329,688 | Bedford | Sept. 21, 1943 |
| 2,560,530 | Burdick | July 10, 1951 |
| 2,698,979 | Flora | Jan. 11, 1955 |
| 2,713,284 | Bedford | July 19, 1955 |
| 2,833,583 | Stone et al. | May 6, 1958 |
| 2,836,215 | Rapata | May 27, 1958 |
| 2,863,195 | Elms | Dec. 9, 1958 |
| 2,909,957 | Rapata | Oct. 27, 1959 |

FOREIGN PATENTS

| | | |
|---|---|---|
| 745,788 | Great Britain | Feb. 29, 1956 |